United States Patent Office 3,716,588
Patented Feb. 13, 1973

3,716,588
MERCAPTO-METHYL SULPHIDES
Christian Esclamadon, Billere, Yves Labat, Pau, and Jean-Baptiste Signouret, Billere, France, assignors to Societe Anonyme dite: Societe Nationale des Petroles d'Aquitaine, Tour Aquitaine, Courbevoie, France
No Drawing. Filed Jan. 28, 1970, Ser. No. 6,587
Claims priority, application France, Jan. 31, 1969,
6902062
Int. Cl. C07c *149/10*
U.S. Cl. 260—609 R                    8 Claims

ABSTRACT OF THE DISCLOSURE

A process for the preparation of mercapto-methyl sulphides, the sulphide functions of which are in the α-position relatively to the terminal thiol functions, comprises causing a mercaptan RSH or a dimercaptan HS—R—SH to react with an aldehyde R'CHO, and sulphurising with $H_2S$ the hemimercaptal or dihemimercaptal $$R-S-\underset{R'}{CH}-OH \text{ and } HO-\underset{R'}{CH}-S-R-S-\underset{R'}{CH}-OH$$

compound thus obtained, wherein R is a hydrocarbon group having from 1 to 12 carbon atoms; it can be an alkyl, cycloalkyl or aryl group, which may comprise thioether or ether groups or any other functional group which does not react with $H_2S$; R' can be hydrogen, a saturated or unsaturated alkyl radical, a saturated or unsaturated cycloalkyl radical or an aryl radical.

New mercapto-methyl sulphides are thus obtained.

The invention includes processes for plasticising sulphur with these new thiols, and, as new industrial products, plastic sulphur compositions.

---

The present invention relates to processes for the preparation of mercapto-methyl sulphides and it provides novel processes for doing this, as well as new compounds and industrial products prepared from them.

It is one of the objects of this invention to provide improved processes for the production of such mercapto-methyl sulphide compounds and also processes for utilising them in the production of compositions for industrial use.

A further object of the invention is the provision of novel mercapto-methyl sulphides.

The invention is especially concerned with compounds the sulphide functions of which are in the α-position relatively to the terminal thiol functions. It provides novel compounds which can be represented by the general Formula I:

$$A-T_{(n)}-R-S-\underset{R'}{CHSH}$$

in which: R is a hydrocarbon group of 1 to 12 carbon atoms, which may be an alkyl, cycloalkyl or aryl group, which may or may not include one or more divalent groups $(T)_n$. R can also represent a thioether, ether, or any other functional group which is non-reactive with $H_2S$; n can have a value from 0 to 20; A can be hydrogen, an alkyl group or a thiol or thioether group; R' can be hydrogen, a saturated or unsaturated alkyl radical, or a saturated or unsaturated cycloalkyl radical or aryl radical.

The mercapto-methyl sulphides are extremely useful industrial products. The simultaneous presence of sulphide functions and thiol functions makes these products very reactive and capable of being used in a large number of fields; like the linear or cyclic polysulphides which are obtained by oxidation of mercapto sulphides, they form a desirable material for the plasticising of sulphur.

The various sulphur compositions which can be obtained by the reaction of molten sulphur with either the polysulphides or with the mercapto-methyl sulphides can be used for a large number of purposes. The relative proportions of each constituent can vary within wide limits: a wide range of proportions, for example from 1% to 99%, of plasticiser can be added to the sulphur.

Depending on the composition, these plastic compositions can be used for different purposes. They can form excellent coatings especially for concrete, brickwork, asphalted surfaces or other similar materials. One particularly practical use is that of the provision of roadway strips or lines. These plastic compositions can also be used as a floor covering by direct pouring or casting, possibly with a mixture of sand and/or gravel, with which they form a cement. These products can also be used as sealing joints or as a mastic, or as a material in the building industry.

The sulphur composition which is obtained can be modified in one of the ways known at the present time for similar materials, for example to impart to the material a better adhesive power and to reduce its inflammability. Balls of a plastics material, rubber or glass, or suitable colouring agents or dyes, can also be incorporated into the plasticised sulphur (mainly for the provision of roadwaly strips).

The mercapto-methyl sulphides are also suitable as synthesis intermediaries for the manufamture of products having a biological action. They are oil modifiers. They can also be used in other cases where mercaptans are normally employed.

Among the mercapto-methyl sulphides which correspond to the general formula:

$$A-T_{(n)}-R-S-\underset{R'}{CH}-SH$$

there are two compounds in which $n=0$, A is hydrogen, R is either $CH_2$ or $C_2H_4$ and R' is hydrogen. These compounds may be prepared by converting 1-chloro-2-thia-propane or butane into mercaptan. The 1-chloro-2-thia-alkyl can be prepared either by the action of formaldehyde on methyl or ethyl mercaptan and the treatment of the resulting product with thionyl chloride, or by the action of chlorine on the dialkyl sulphide. However, this process comprises three steps; it makes use of chlorinating agents the handling of which is not always easy, and it then necessitates the substitution of these agents. The process is long, troublesome and inconvenient. Furthermore, it is only suitable for the preparation of the simplest R—S—CH₂—SH compounds, in which R is either a methyl radical or an ethyl radical. This process would not permit the obtaining of all the compounds conforming to the general formula given above, including particularly compounds comprising ether or thioether groups.

These are mercapto-methyl sulphides which have as their general formulae:

$$R-S(CH_2)_xSH \text{ and } HS-(CH_2)_xS-(CH_2)_xSH$$

in which $x$ has a value higher than 1. These mercapto-methyl sulphides are outside the scope of the present invention, which is concerned with the mercapto-methyl sulphides the sulphide functions of which are in the α-position relatively to the terminal thiol functions.

There are also other mercapto-methyl sulphides which correspond to the general formula:

$$A-T_{(n)}-R-S-\underset{R'}{CH}-SH$$

in which R contains a single carbon atom and is $CH_2$, T being a thioether group, n being equal to or greater than 0, and A being a thiol group.

These products have been prepared and described in several patents. They can be represented by the general formula $HS(CH_2S)_n \cdot H$, or even also by the formula $HS(CH_2S)_{n'-2}CH_2S\text{---}CH_2SH$ ($n' \gg 2$).

These products have been obtained by the action of $H_2S$ on an aqueous formaldehyde solution (U.S. Pat. No. 3,056,841 and French Pats. Nos. 1,362,500, 1,465,475). It is also possible to obtain dithiols of formula $$HS(CH_2S)_n \cdot H$$

by a process which consists in causing hydrogen sulphide to react with a polythioether glycol $HO(CH_2S)_mCH_2OH$ ($m = n' + 1$) (French Pat. No. 1,542,457).

Thus, the methods of preparation hitherto proposed lead to the production of only a limited number of mercapto-methyl sulphides. In the compounds which have been made using these methods, the group R is always and only $CH_2$, T is a thioether group and A is a thiol group.

The process of the present invention makes it possible to produce a wide range of mercapto-methyl sulphides, including particularly those of the general Formula I:

$$A\text{---}T_{(n)}\text{---}R\text{---}S\text{---}CH_2SH$$
$$|$$
$$R'$$

in which R is a hydrocarbon group of 1 to 12 carbon atoms, A is hydrogen, an alkyl group or a thiol or thioether group, T is a divalent group in which $n$ is 0 to 20 and R' is hydrogen, a saturated or unsaturated alkyl radical or a saturated or unsaturated cycloalkyl radical or aryl radical.

Compounds according to the above Formula I in which R has at least 3 carbon atoms, while A is hydrogen and $n$ equals 0, as well as similar compounds in which R is $CH_2$, while A is a thiol radical, $n$ is greater than or equal to 0, and T is a thioether group, in particular, are valuable new features of the present invention.

The process of the invention for the preparation of mercapto-methyl sulphides comprises causing a mercaptan RSH or a dimercaptan HS—R—SH to react with an aldehyde R'CHO (in which R and R' have the meanings defined above) and in sulphiding with $H_2S$ the hemimercaptal or the dihemimercaptal thus obtained, these having as general formula:

$$R\text{---}S\text{---}CH\text{---}OH \text{ and } HO\text{---}CH\text{---}S\text{---}R\text{---}S\text{---}CH\text{---}OH$$
$$\;\;\;\;\;\;\;\;\;\;\;|\;\;\;\;\;\;\;\;\;\;\;\;\;\;\;\;\;\;\;\;\;\;\;\;\;\;\;\;|\;\;\;\;\;\;\;\;\;\;\;\;\;\;\;\;\;\;\;\;\;\;\;\;\;\;|$$
$$\;\;\;\;\;\;\;\;\;\;\;R'\;\;\;\;\;\;\;\;\;\;\;\;\;\;\;\;\;\;\;\;\;\;\;\;\;\;\;R'\;\;\;\;\;\;\;\;\;\;\;\;\;\;\;\;\;\;\;\;\;\;\;\;R'$$

respectively.

Theoretically, the action of a stoichiometric quantity of hydrogen sulphide on the hemimercaptals and dihemimercaptals should lead to the following two types of products:

$$RS\text{---}CH_2\text{---}SH \text{ and } HS\text{---}CH_2\text{---}S\text{---}R\text{---}CH_2\text{---}SH$$

It is rather surprising to find that, during this reaction, if carried out according to the invention, there are also obtained the more complex products $R\text{---}S\text{---}(CH_2S)_nH$ and $H(S\text{---}CH_2)_nS\text{---}R\text{---}S(CH_2S)_n$, in which $n$ can have values higher than 1, extending up to 20, these products also coming within the scope of the above general Formula I.

The working procedure consists in causing a reaction in stoichiometric quantity of the mercaptan with the aldehyde (that is to say, 1 mole of aldehyde per thiol function), while stirring the mixture; thereafter, directly into the reaction mixture and without having isolated the formed hemimercaptal or dihemimercaptal, there is introduced, either in the form of a gaseous stream or into an autoclave under pressure, the quantity of $H_2S$ which is necessary completely to sulphurise the hemimercaptal.

The mixing of the mercaptan with the aldehyde is effected either at ambient temperature, or at a temperature at which the mercaptan is in liquid form. As the reaction is exothermic, the temperature is allowed to rise progressively.

The second step, which is that of the sulphurisation of the hemimercaptal, is also effected with vigorous stirring. This takes place at temperatures which can vary from 20° to 90° C.; the reaction can be carried out either at atmospheric pressure, or at pressures which may vary between 1 and 100 atmospheres. The pH can be between 3 and 8; it can in particular be that of the reaction medium. The time necessary for effecting the sulphurisation of the hemimercaptal or dihemimercaptal is different, depending on whether a stream of $H_2S$ is used, or whether the operation takes place under pressure. It is generally between 1 and 16 hours and it is usually from 6 to 8 hours.

The authors of the present invention have observed that any modification made to one of the operating conditions, temperature, pressure, pH, reaction time, and molecular ratio $H_2S$/hemimercaptal, has an influence on the nature of the products which are obtained, as well as on the quantities thereof which are produced.

The invention is illustrated by the following examples:

EXAMPLE 1

Preparation of 1-mercapto-2-thiapropane and 1-mercapto-2,4-dithiapentane 138 g. (2.9 moles) of methyl mercaptan in liquid form are introduced into a reactor which is cooled with a mixture of ice and salt, the reactor being equipped with a stirrer mechanism, a condenser through which flows a refrigerating liquid at $-20°$ C., and a thermometer, and 250 g. of a commercial formol solution containing 2.9 moles of formol are added.

The temperature of the reaction assembly is raised to $+7°$ C. The mixture becomes homogeneous after stirring for 5 hours.

The reaction mixture is saturated with a stream of $H_2S$ for 9 hours at 70° C. The organic phase, formed by the crude product, weighs 190 g. By distillation 70 g. of 1-mercapto-2-thiapropane are separated.

The properties of this product are:

Boiling point = 60° C./47 mm. Hg
Refractive index = 1.550 at 20° C.

50 g. of a liquid product having a mercaptan function are also obtained. Analysis of this product shows that a new product has been obtained, namely 1-mercapto-2,4-dithiapentane, the characteristics of which are as follows:

Boiling point = 80° C./0.15 mm. Hg
Refractive index = 1.596 at 20° C.

EXAMPLE 2

Preparation of 1-mercapto-2-thiabutane and 1-mercapto-2,4-dithiahexane

Into a reactor cooled with an ice bath are introduced 310 g. (5 moles) of ethyl mercaptan and 416 g. of an aqueous solution containing 5 moles of formol. The reaction is exothermic. The temperture of the reaction medium is kept at 20° to 25° C. for 5 hours. The resulting homogeneous solution is then saturated with $H_2S$; the operation lasts 10 hours at 70° C. 330 g. of an organic phase are recovered. Distillation under reduced pressure gives 125 g. of a first fraction, which comprises 1-mercapto-2-thiabutane, the characteristics of which are:

Boiling point = 50° C./15 mm. Hg
Refractive index = 1.5345 at 20° C.

A second fraction contained 75 g. of a new compound, 1-mercapto-2,4-dithiahexane, the characteristics of which are:

Boiling point = 70° C./0.4 mm. Hg
Refractive index = 1.585 at 20° C.

EXAMPLE 3

Preparation of 1-mercapto-2-thiahexane

Into a reactor equipped with a stirrer mechanism, a condenser and a thermometer there are introduced 180 g. of butyl mercaptan, followed by 60 g. of formol in the form of a commercial aqueous solution. The temperature is kept at 20°–30° C. for 5 hours. The solution becomes homogeneous and is then saturated with $H_2S$ at 70° C. for 10 hours. The resulting organic phase is decanted and is distilled under reduced pressure; there are collected 70 g. of 1-mercapto-2- thiahexane. This is a new product, the characteristics of which are as follows:

Boiling point=70° C./0.4 mm. Hg
Refractive index=1.516 at 20° C.

EXAMPLE 4

Preparation of 1,4-dimercapto-2-thiabutane and 1,7-dimercapto-2,5-dithiaheptane

Into a reactor equipped with a stirrer mechanism and a reflux condenser there are introduced 141 g. (1.5 moles) of dithiol ethane and 3.15 moles of a 30% formol solution. The mixture, which is obtained at ambient temperature, is progressively brought to 40° C. over a period of 5 hours. The solution is homogeneous. A stream of $H_2S$ is caused to pass into this aqueous solution, while the temperature is kept at 65° C., for 7 hours. The resulting organic phase weighs 300 g. By distillation, there are obtained:

(1) 120 g. of a new dimercaptosulphide, which is 1,4-dimercapto-2-thiabutane, the characteristics of which are as follows:

Refractive index=1.618.

(2) 100 g. of a new dimercapto disulphide, which is 1,7-dimercapto-2,5-dithiaheptane, having a refractive index of 1.634.

EXAMPLE 5

A reaction of the same type as that described in Example 4 is carried out, but replacing the preceding mercaptan by dithiol hexane. As well as 1,10-dimercapto-2,9-thiadecane, more complex mercapto sulphides are obtained, which it has not been found possible to separate by distillation.

EXAMPLE 6

This example describes a process for the plasticization of sulphur, or of sulphur compositions, by using compounds obtained as above.

The modifications of the properties of the sulphur can be obtained, either with methyl-mercapto sulphides prepared according to the invention, or with the dimercaptan polysulphide polymers which are obtained by causing a reaction, at a temperature close to 50° C. and in the presence of a basic catalyst (for example an amine), of the dithiol and the sulphur in substantially stoichiometric proportions, or with the cyclic polysulphides obtained from mercapto-methyl sulphides.

In order to obtain the plasticised modified sulphur, the selected proportions of the mercapto-methyl sulphides or the linear or cyclic polysulphide polymers are mixed together. Depending on the intended uses for the modified sulphur, the proportions can be from 1% to 99% by weight of plasticiser to 99% to 1% of sulphur. This mixture is heated to a temperature which is between 140° and 180° C., for about one hour, while stirring vigorously, so as to promote the reaction between the sulphur and the plasticiser. After reaction, the modified sulphur composition can be crushed, after it has been cooled. It then has to be reheated to the liquid state at the time of use. Alternatively, it can be directly applied as a film, or mixed with gravel in order to obtain a cold-hardening sulphur concrete.

We claim:

1. Mercapto-methyl sulphide selected from the group consisting of 1-mercapto-2,4-dithiapentane
1-mercapto-2,4-dithiahexane
1-mercapto-2-thiahexane
1-mercapto-2-thiabutane
1,7-dimercapto-2,5-dithiaheptane
1,4-dimercapto-2-thiabutane
1-mercapto-2-thiapropane, and
1,10-dimercapto-2,9-thiadecane 2. A mercapto-methyl sulphide according to claim 1, which is 1,4-dimercapto-2-thiabutane.

3. A mercapto-methyl sulphide according to claim 1 which is 1,7-dimercapto-2,5-dithiaheptane.

4. A mercapto-methyl sulphide according to claim 1 which is 1-mercapto-2-thiapropane.

5. A mercapto-methyl sulphide according to claim 1 which is 1,10-dimercapto-2,9-thiadecane.

6. A mercapto-methyl sulphide according to claim 1, characterised in that it is 1-mercapto-2,4-dithiapentane.

7. A mercapto-methyl sulphide according to claim 1, characterised in that it is 1-mercapto-2,4-dithiahexane.

8. A mercapto-methyl sulphide according to claim 1, characterised in that it is 1-mercapto-2-thiahexane.

References Cited

UNITED STATES PATENTS

| 3,567,782 | 3/1971 | Warner et al. | 260—609 A |
| 3,548,007 | 12/1970 | Comte | 260—609 A |

FOREIGN PATENTS

| 1,542,457 | 10/1968 | France | 260—609 A |

OTHER REFERENCES

Walker: "Formaldehyde," Third edition, pp. 279, 280 (1964).

LEWIS GOTTS, Primary Examiner

D. R. PHILLIPS, Assistant Examiner

U.S. Cl. X.R.

106—19, 85; 260—609 D